United States Patent
Bryan

(10) Patent No.: US 9,357,867 B2
(45) Date of Patent: Jun. 7, 2016

(54) REMOTELY CONTROLLED ADJUSTABLE MAILBOX SUPPORT

(71) Applicant: Jeffrey Bryan, Califon, NJ (US)

(72) Inventor: Jeffrey Bryan, Califon, NJ (US)

( * ) Notice: Subject to any disclaimer, the term of this patent is extended or adjusted under 35 U.S.C. 154(b) by 0 days.

(21) Appl. No.: 14/794,905

(22) Filed: Jul. 9, 2015

(65) Prior Publication Data

US 2016/0037950 A1 Feb. 11, 2016

Related U.S. Application Data

(60) Provisional application No. 62/033,371, filed on Aug. 5, 2014.

(51) Int. Cl.
*A47G 29/122* (2006.01)
*G05D 3/10* (2006.01)

(52) U.S. Cl.
CPC .......... *A47G 29/1216* (2013.01); *A47G 29/122* (2013.01); *G05D 3/10* (2013.01)

(58) Field of Classification Search
CPC . A47G 29/1216; A47G 29/122; A47G 29/30; G05D 3/10; F16M 11/04; F16M 11/046; F16M 11/10
USPC .................. 232/39; 248/132, 133, 371, 178.1, 248/176.3, 125.1, 125.2; 318/695
See application file for complete search history.

(56) References Cited

U.S. PATENT DOCUMENTS

| | | | | |
|---|---|---|---|---|
| 2,438,043 A * | 3/1948 | Gottlieb | ............. | A47G 29/1216 248/145 |
| 2,902,211 A * | 9/1959 | Franklin | ............. | A47G 29/1216 232/17 |
| 3,066,616 A * | 12/1962 | Weisberg | ........... | A47G 29/1216 104/108 |
| 3,593,914 A * | 7/1971 | Van Orden | ......... | A47G 29/1216 232/17 |
| 4,114,801 A * | 9/1978 | Van Orden | ......... | A47G 29/1216 232/17 |
| 4,403,760 A * | 9/1983 | Alvermann | ........ | A47G 29/1216 248/284.1 |
| 5,433,376 A * | 7/1995 | Kueshner | ........... | A47G 29/1216 232/17 |
| 5,632,441 A * | 5/1997 | Toval | .................. | A47G 29/1216 232/17 |
| 6,164,527 A * | 12/2000 | Garey | ................ | A47G 29/1216 232/39 |
| 6,840,438 B2 * | 1/2005 | Hassan | .............. | A47G 29/1216 232/39 |
| 7,051,920 B1 * | 5/2006 | Asch | .................... | A47G 29/1216 104/177 |
| 7,854,374 B2 * | 12/2010 | Dudley | .............. | A47G 29/1209 232/17 |
| 7,938,314 B1 * | 5/2011 | Benesh | .............. | A47G 29/1209 232/29 |
| 8,123,113 B1 * | 2/2012 | Hartman | ............ | A47G 29/1216 232/39 |
| 8,490,859 B1 * | 7/2013 | Master | ............... | A47G 29/1216 232/17 |
| 2003/0218059 A1 * | 11/2003 | Hassan | .............. | A47G 29/1216 232/45 |
| 2014/0263881 A1 * | 9/2014 | Bryan | ................ | A47G 29/1216 248/125.2 |

* cited by examiner

*Primary Examiner* — William Miller
(74) *Attorney, Agent, or Firm* — Thomas J. Germinario

(57) ABSTRACT

A remotely controlled adjustable mailbox support uses a stepping motor, controlled by a microprocessor/CPU, to raise a mailbox platform above a level where the mailbox can be damaged by a passing snow plow. Based on remote command signals received by a internal communications module, the time and duration when the mailbox is raised can be controlled, as well as the height to which it is raised. An optional temporary rf-signal over-ride capability for mail carriers and/or snow plow operators is also provided, as well as control application software for wireless mobile devices.

5 Claims, 5 Drawing Sheets

REMOTELY CONTROLLED ADJUSTABLE MAILBOX SUPPORT

REFERENCE TO RELATED APPLICATION

This application claims the benefit of the filing date of U.S. provisional application 62/033,371, filed Aug. 5, 2014.

FIELD OF INVENTION

The present invention relates to the field of structures used to support mailboxes, and more particularly to adjustable mailbox posts.

BACKGROUND OF THE INVENTION

Mailbox posts of the type having a vertical support member and one or more horizontal support members are in widespread use in rural and semi-rural areas. These mailbox posts are typically located immediately adjacent to a road or street, so that the mail delivery person in a vehicle can open the mailbox and collect and/or insert mail without getting out of the delivery vehicle. In order to facilitate this mail delivery procedure, U.S. Postal Service guidelines require that the mailbox be positioned at a height of 41 to 45 inches above the road/street surface.

Because of the proximity of the mailbox and post to the road, they are often damaged or detached by snowplowing—either by direct impact or by the pressure of snow pushed against them. During snow storms, therefore, it is useful to be able to adjust the mailbox post so that the mailbox is more out of the way of plows and roadside snow piles. Even if a mailbox is designed to allow it to be displaced from the path of snow plows, however, the homeowner is often not present to make the adjustment before the snow plows arrive. Therefore, it is desirable to provide a mailbox support structure in which the height of the mailbox above the road/street surface is remotely adjustable.

SUMMARY OF THE INVENTION

As shown in FIGS. 1-4, the remotely controlled adjustable mailbox support of the present invention comprises a vertical post, from which extend two support arms supporting a mailbox platform, to which a mailbox is attached. Within the top portion of the vertical post is a stepping motor, which is connected to the support arms so as to cause them to rotate upward when the motor is activated to an acute angle in relation to the horizontal, sufficient to raise the mailbox above the level of a snowplow.

The activation of the stepping motor is controlled by a microprocessor or a central processing unit (CPU) within the vertical post. The microprocessor or CPU receives mailbox positioning commands through one or more wireless communication and/or routing components, which can include without limitation, a wireless telephone module, a wi-fi module, an rf receiver, and/or an infrared sensor.

In one embodiment, the positioning commands consist simply of raising the mailbox or lowering it. In other embodiments, the positioning commands also specify various height levels—e.g., high, low or medium—to which the mailbox is raised, to reflect different levels of forecast snowfalls. In still other embodiments, the positioning commands also specify a time interval during which the mailbox is raised. For example, the commands may direct that the mailbox be raised at 2 AM on a certain date and lowered at 5 PM on the same date, with the anticipation that snowplows will have completed their work during that interval.

Using the present invention, a homeowner living in Maine can be vacating in Florida and, upon learning of a snowstorm forecast for his/her home state, use a smartphone or tablet to send positioning commands to raise his/her mailbox before the storm begins and lower it again after the storm ends and plowing is complete. In some embodiments, the communication components of the device are configured to receive rf signals which, when transmitted to the microprocessor/CPU, cause the mailbox to be temporarily raised or lowered to accommodate a passing snow plow or postal carrier. In these embodiments, an approaching snow plow operator would activate an rf transmitter to signal for elevation of the mailbox for a short duration, for example 15 minutes, to allow time for the plow to complete its work in the vicinity of the mailbox. Similarly, an approaching postal carrier would activate an rf transmitter to signal for an already elevated mailbox to be lowered for a short duration, during which he/she could deposit mail in the mailbox.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
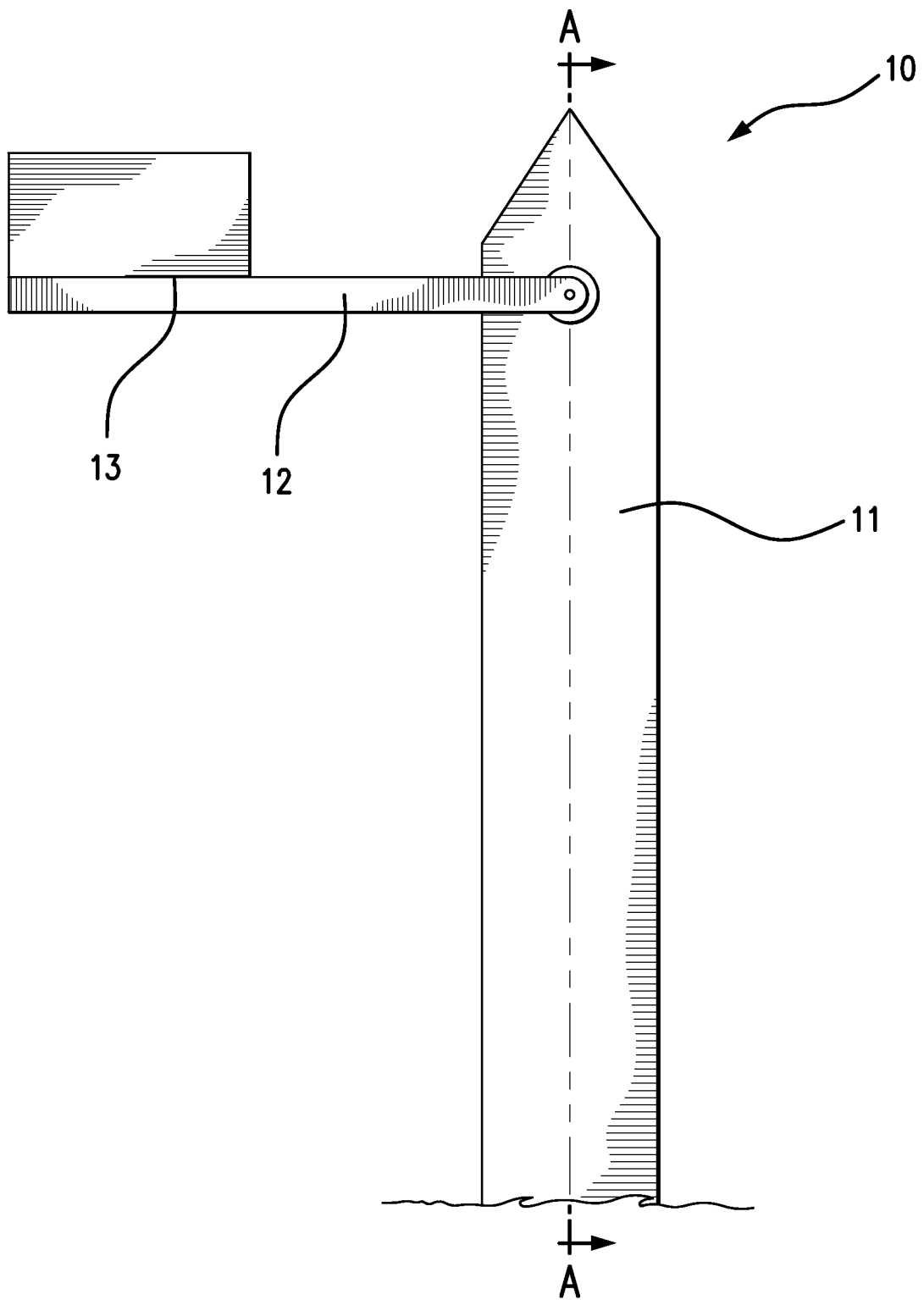
FIG. 1 is a side profile view of a remotely controlled adjustable mailbox support, shown in the lowered position, according to one embodiment of the present invention.
Figure 2:
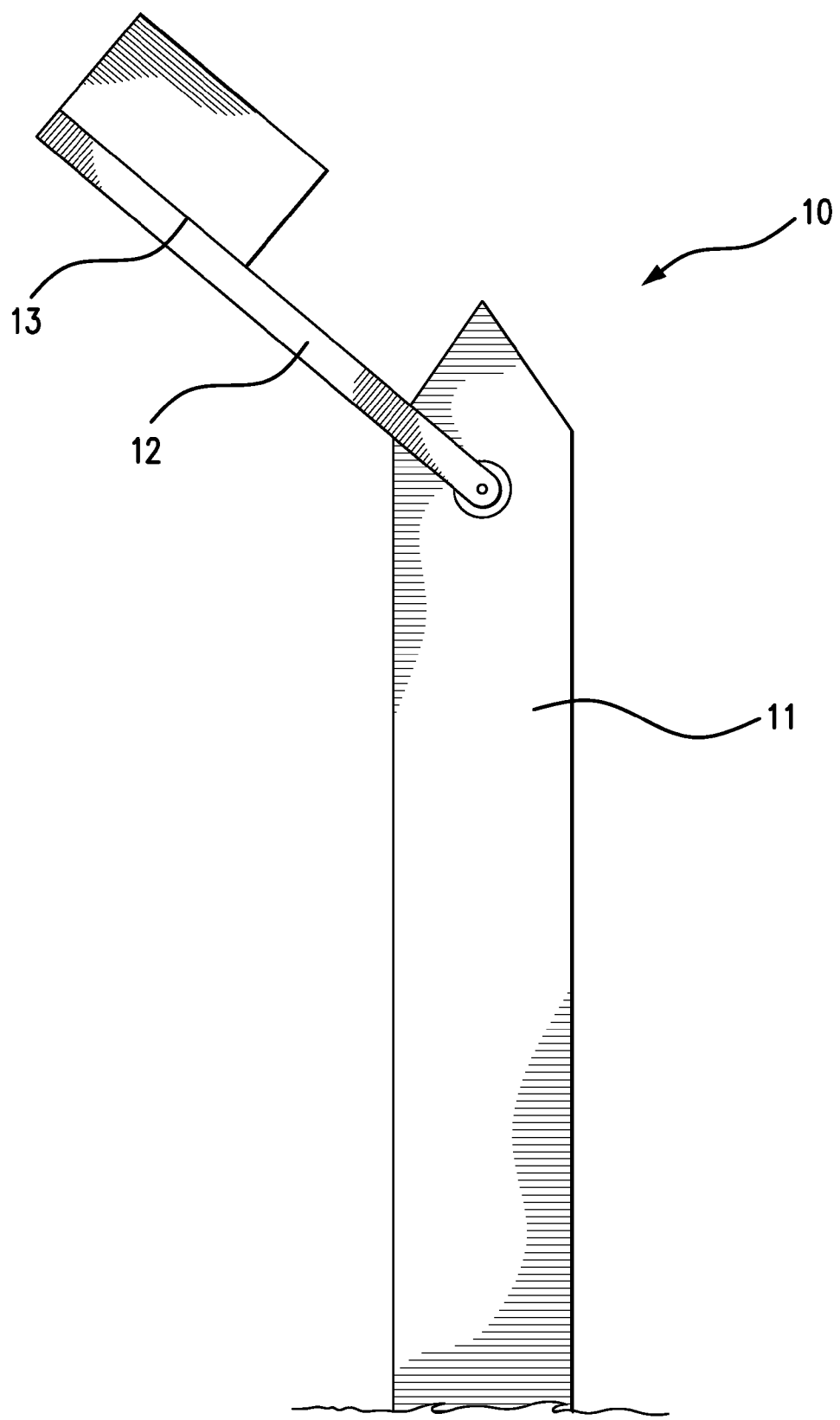
FIG. 2 is a side profile view of the remotely controlled adjustable mailbox support of FIG. 1, shown in the raised position.
Figure 3:
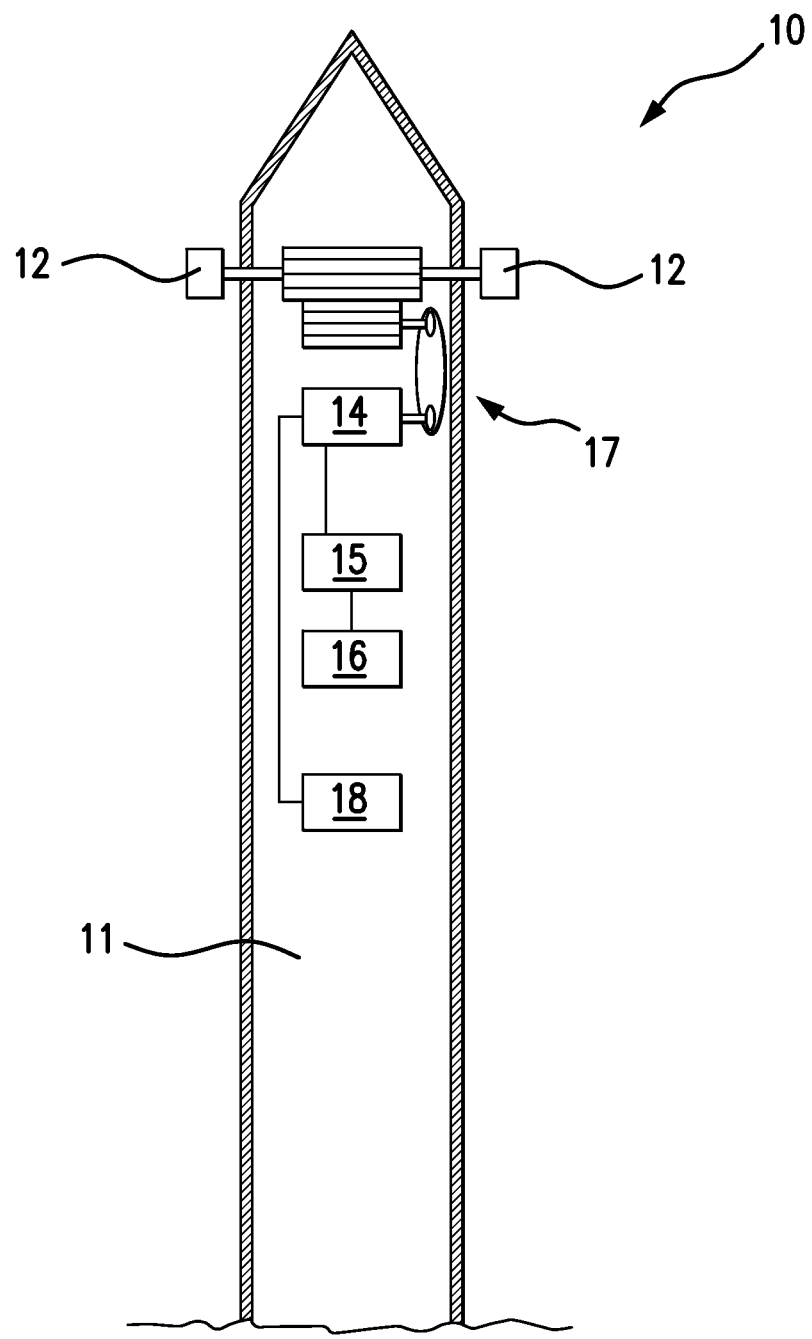
FIG. 3 is a cross-section view of the remotely controlled adjustable mailbox support of FIG. 1, taken along the line A-A.

Referring to FIGS. 1-3, one embodiment of the remotely controlled adjustable mailbox comprises a vertical post 11, from which extend two support arms 12, which support a mailbox platform 13. A portion of the vertical post 11 is hollow and contains the stepping motor 14, the microprocessor/CPU 15 and the command communication/routing components 16. The vertical post 11 can be made of any durable, rigid, weather-resistant metal or plastic.

The stepping motor 14, acting through one or more transmission means 17, such as the gears and belt depicted in FIG. 3, rotates the support arms 12 to one or more acute angular positions (see FIG. 2), in relation to the horizontal, corresponding to one or more elevations above the road/street surface. Either a DC or an AC motor can be used, and its power source 18 can be external AC, internal DC batteries and/or solar cells.

Figure 4:
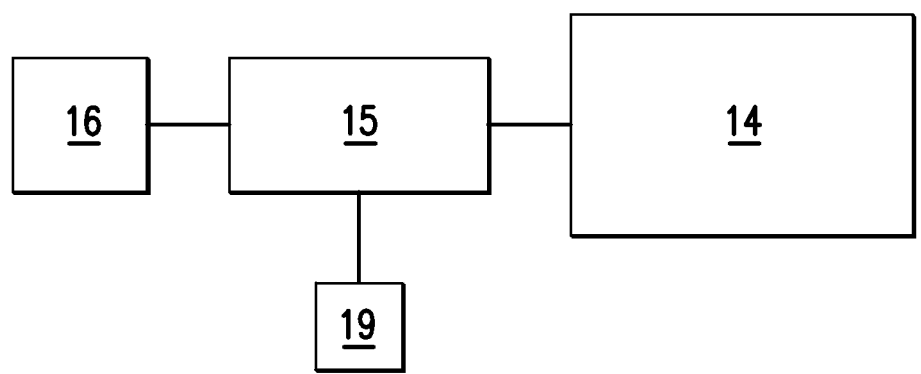
FIG. 4 is a schematic plan of the stepping motor, microprocessor/CPU, communications module, and RF module, according to one embodiment of the present invention.

Referring to FIG. 4, in one embodiment, the stepping motor 14 is controlled by positioning commands received by a wireless telephone module 16 and processed by a microprocessor unit 15, both of which are located inside the vertical post 11. The homeowner can thereby use his/her smartphone or tablet with an app which provides a command menu for raising or lowering the mailbox. The app command menu can also include other options, such as various heights to which the mailbox is to be raised and/or various intervals or durations during which the mailbox is to be raised.

Figure 5:
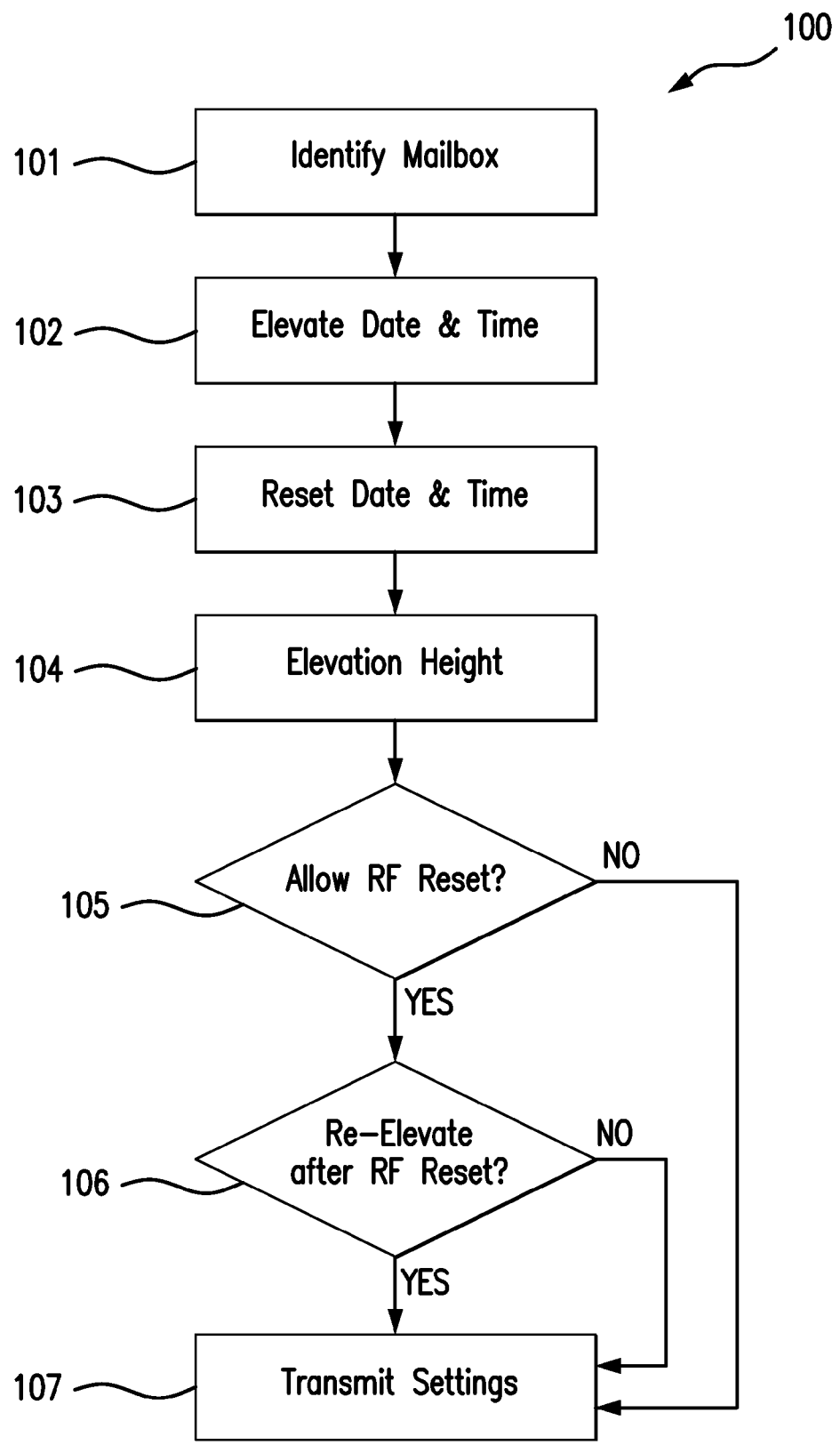
FIG. 5 is a flow chart of the application software for a mobile digital device for one embodiment of the present invention.

Referring to FIG. 5, a flow chart for an exemplary smartphone/tablet app 100 is depicted. The user is prompted to identify the particular mailbox unit to be programmed 101 and then enter the date and time when he/she would like the mailbox platform 13 to be elevated 102, perhaps based on a forecast of a winter storm. The user is next prompted to enter a date and time when the mailbox platform 13 would be reset to its horizontal position 103, perhaps based on the forecasted duration of the winter storm and the anticipated time for snow plowing to be completed after the storm. Next, the user is prompted to enter an elevation height 104 for the mailbox platform 13, which could be selected from high (e.g., over 6 ft.), middle (e.g., 5.5-6 ft.) or low (e.g., 5-5.5 ft.). The app 100 would then ask the user if he/she would permit the mailbox platform 13 to be temporarily reset to its horizontal position by an approaching mail carrier 105, and if so, whether the platform 13 should be re-elevated after the temporary rf reset 106. After all of the app prompts are addressed, the user could transmit the input settings 107 to the remotely controlled adjustable mailbox support 10.

Referring again to FIG. 4, the motor control apparatus of the system can include, along with the stepping motor 14, microprocessor/CPU 15, and routing/communications module 16, an rf module 19, through which a snow plow operator or a postal carrier could activate a temporary raising or lowering of the mailbox platform 13 to accommodate their activities.

Although the preferred embodiments of the present invention have been disclosed for illustrative purposes, those skilled in the art will appreciate that many additions, modifications and substitutions are possible, without departing from the scope and spirit of the present invention.

What is claimed is:

1. A remotely controlled adjustable mailbox support, comprising:
    a vertical post, having two lateral sides and containing one or more interior post cavities;
    two support arms, extending from the lateral sides of the vertical post and supporting a mailbox platform, wherein the support arms are rotatable from a horizontal lowered support position to one or more raised support positions, in which the support arms are oriented at acute angles in the relation to the horizontal lowered support position;
    a stepping motor, located within one of the interior post cavities, wherein the stepping motor mechanically engages the support arms through one or more transmission means, and wherein the stepping motor is configured to perform an elevation control process, in which the stepping motor raises and lowers the support arms between the horizontal lowered support position and the raised support positions;
    a motor controller, comprising a microprocessor or CPU, located within one of the interior post cavities and in electrical or wireless communication with the stepping motor, wherein the motor controller is configured to transmit motor control signals to the stepping motor, which motor control signals are configured to activate and control the elevation control process; and
    a wireless communications module, located within one of the interior post cavities and in electrical or wireless communication with the motor controller, wherein the communications module is configured to wirelessly receive remote command signals from a remote command source and to transmit the remote command signals to the motor controller so as to activate and configure the motor control signals transmitted from the motor controller to the stepping motor.

2. The remotely controlled adjustable mailbox support of claim 1, wherein the remote command signals and the motor control signals are configured to activate and control the elevation control process so that the support arms are elevated to one of the raised support positions at a specified first date and time and so that the support arms are lowered to the horizontal lowered support position at a subsequent specified second date and time.

3. The remotely controlled adjustable mailbox support of claim 2, wherein the remote command signals and the motor control signals are configured to activate and control the elevation control process so that the support arms are elevated to one of the raised support positions corresponding to a specified height of the mailbox platform.

4. The remotely controlled adjustable mailbox support of claim 3, wherein the communications module is configured to receive some of the remote command signals in the form of rf signals, and the motor controller is configured to transmit, in response to the rf signals, the motor control signals so as to activate and control the elevation control process for a limited duration, not exceeding a half-hour, to accommodate snow plowing or mail delivery activities.

5. The remotely controlled adjustable mailbox support of claim 4, wherein the remote command source is a mobile wireless digital communications device, which is configured so that the remote command signals are formulated through an application software.

* * * * *